June 30, 1931.   A. SPRINGMANN   1,812,178

FLY CATCHER

Filed Oct. 27, 1928

Inventor:
Adolf Springmann

Patented June 30, 1931

1,812,178

UNITED STATES PATENT OFFICE

ADOLF SPRINGMANN, OF SCHRAMBERG, GERMANY

FLY CATCHER

Application filed October 27, 1928, Serial No. 315,546, and in Germany May 24, 1928.

This invention relates to a device for catching flies and other winged insects and consists in the provision of a suction tube carrying at its upper end a downwardly directed conical shell or flange as well as a bait cap which latter is supported over the nozzle of the tube so that insects attracted to the same by the bait will be drawn by the suction into the tube.

Figure 1:
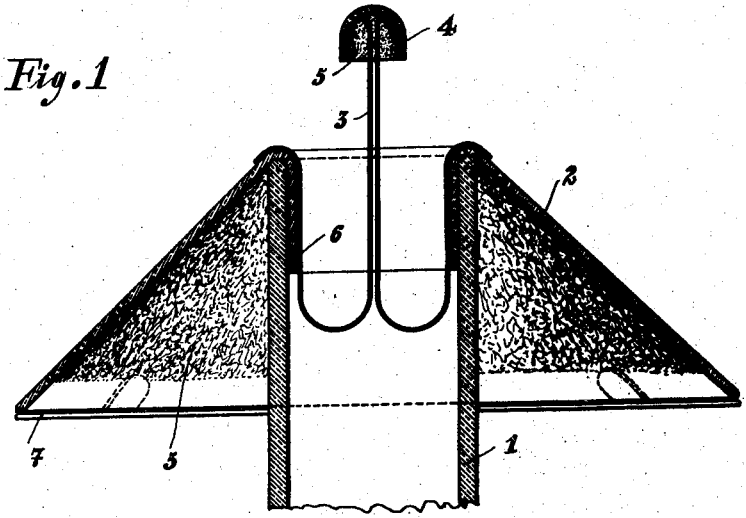
Figure 2:
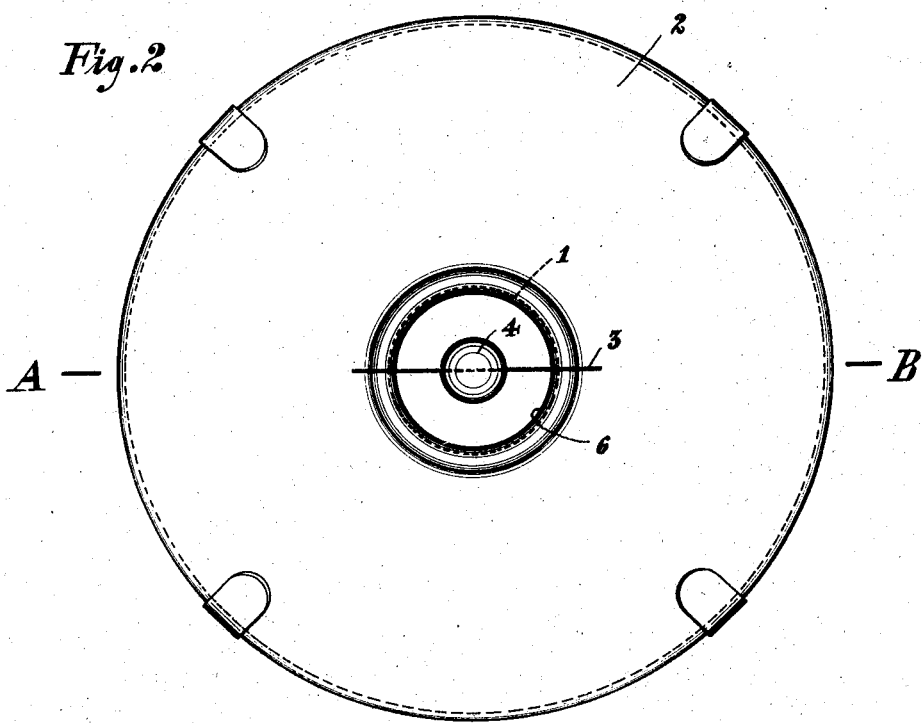

Fig. 1 of the accompanying drawings represents a vertical section of the apparatus, and Fig. 2, a top view of the same.

The fly or like catcher is composed of a tube 1 which is normally supported in an upright position and which is connected to a fan or other exhausting element so as to form a suction nozzle. The tube carries a downwardly directed flange or shell 2 which is preferably supported loosely on the tube, for instance by means of a nipple 6 adapted to engage over the tube edge. A wire bracket 3, which is also supported on the end of the tube, is adapted to carry a cap 4 in a central position above the tube orifice just outside the suction zone. The insides of the cap 4 and of the shell 2 are coated with some substance adapted to attract the insects by its odour. The shell 2 is closed by a plate or a gauze disc 7 which prevents the insects from reaching the bait inside the shell. The insects are therefore induced to travel up the shell towards the cap 4 and will, on passing through the suction zone, be drawn into the tube.

The tube 1 as well as the shell 2 are preferably made of glass so as to be as inconspicuous as possible.

The device may be connected to a ventilator employed in a shop or a display window so as to keep insects away from victuals and the like while the air is at the same time renewed by the fan.

The tube 1 can be used without the shell and bait cap and moved about the place for catching insects wherever the latter may happen to be located.

I claim:

A fly or like catcher for a suction device, comprising an open-ended, upright glass tube, a conical glass shell having a centrally disposed, downwardly directed nipple adapted to fit inside the upper end of the tube, a bait cap, and means for supporting said bait cap on the shell above the orifice of the tube.

ADOLF SPRINGMANN.